No. 781,583. PATENTED JAN. 31, 1905.
H. H. ARKWRIGHT.
PUMP.
APPLICATION FILED MAY 6, 1904.
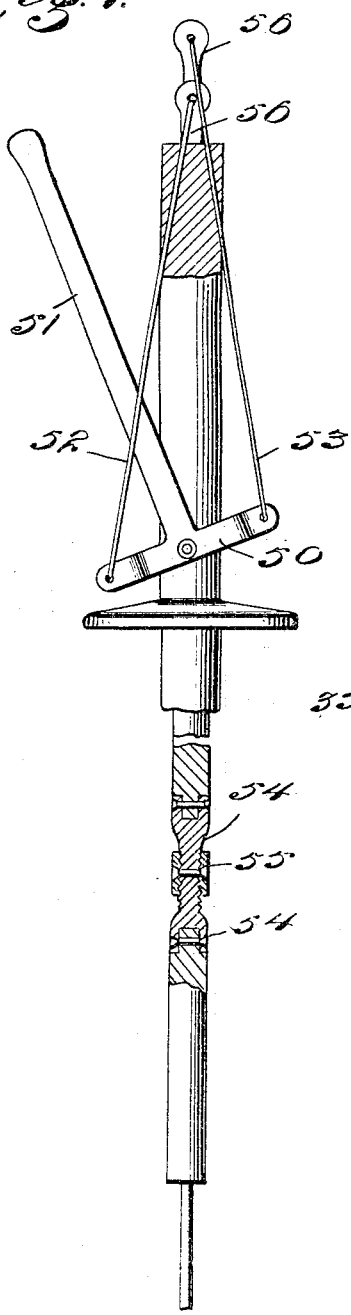
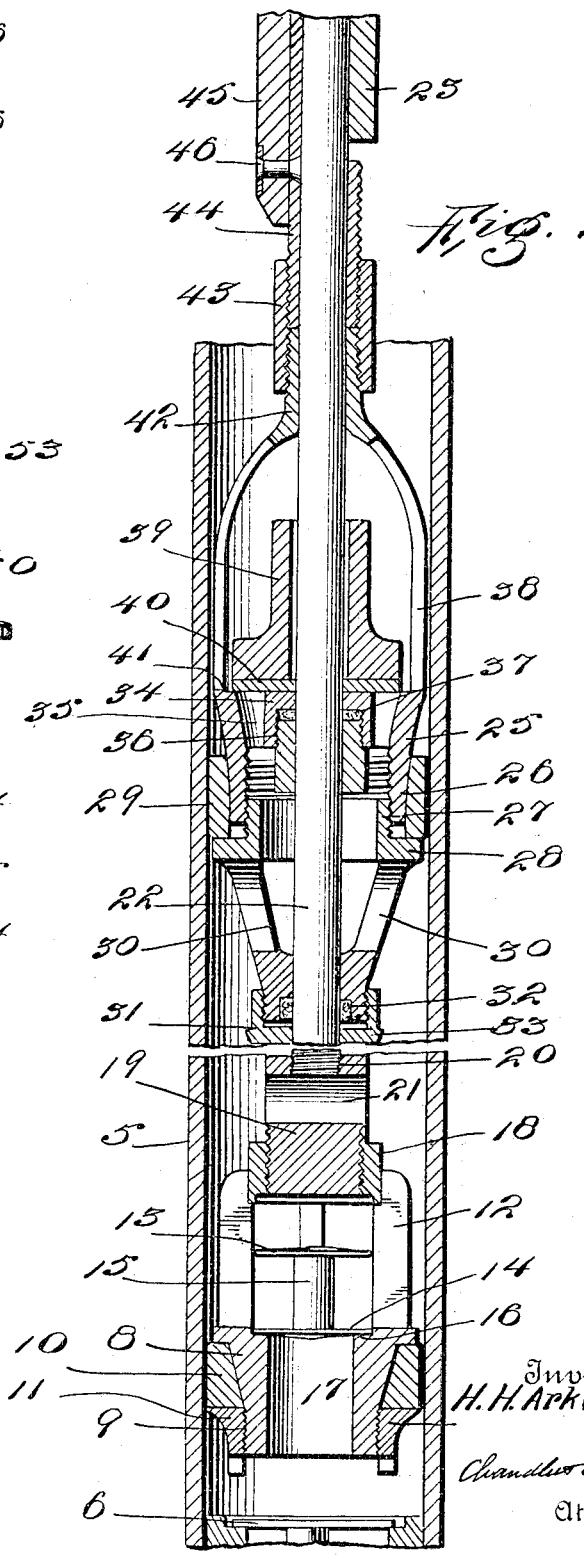
Witnesses
A. M. Simpson
W. C. O. Keyes
Inventor
H. H. Arkwright
By
Chandler & Chandler
Attorneys No. 781,583.  
Patented January 31, 1905.

UNITED STATES PATENT OFFICE.

HARRISON H. ARKWRIGHT, OF MONTPELIER, OHIO.

PUMP.

SPECIFICATION forming part of Letters Patent No. 781,583, dated January 31, 1905.

Application filed May 6, 1904. Serial No. 206,717.

*To all whom it may concern:*

Be it known that I, HARRISON H. ARKWRIGHT, a citizen of the United States, residing at Montpelier, in the county of Williams, State of Ohio, have invented certain new and useful Improvements in Pumps; and I do hereby declare the following to be a full, clear, and exact description of the invention, such as will enable others skilled in the art to which it appertains to make and use the same.

This invention relates to pumps, and more particularly to that class employed in connection with deep wells, although it will be understood from the following description that it will operate with equal efficiency in shallow wells.

The object of the invention is to provide a construction wherein there will be produced a continuous flow of water and in which there will be required a minimum of energy in its operation.

A further object of the invention is to provide such a specific construction and arrangement of parts as will insure against excessive wear and which will maintain the working parts tightly packed to prevent leakage.

Other objects and advantages of the invention will be understood from the following description.

In the drawings forming a portion of this specification, and in which like numerals of reference indicate similar parts in the several views, Figure 1 is a view showing a portion of a pump embodying the present invention. Fig. 2 is a view, partly in section and partly in elevation, showing the pistons on an enlarged scale.

Referring now to the drawings, there is shown a portion of a pump-barrel 5, having at the bottom the usual upwardly-opening valve 6. Instead of the usual single piston there is employed in the present construction two pistons. The lower piston consists of a tubular member 8, the lower end portion of which is reduced in diameter and provided with threads 9, above which threads the member 8 is gradually increased in exterior diameter, and upon this portion is disposed a leather washer 10. A compression-nut 11 is engaged with the threads 9, and when screwed thereonto forces the washer 10 upon the tapered portion of the body 8, so that the washer is expanded and made to fit the pump-barrel water-tight. Upon the body portion 8 is a cage 12, in which is a valve comprising the vertically-spaced disks 13 and 14 and the connecting-stem 15, the disk 14 being adapted to rest in a seat 16 at the bottom of the cage to close the passage 17 in the body 8 against downward flow of water. The valve has sufficient vertical movement in the cage to move out of the seat 16 and permit upward flow of water through the passage 17.

The cage 12 comprises vertical bars, which are spaced and connected at their upper ends to an interiorly-threaded collar 18, in which is engaged a threaded cylindrical plug 19, having a threaded socket 20 in its upper end which communicates with a transverse passage 21. In the socket 20 is engaged the threaded lower end of a piston-rod or pump-rod 22, which is connected in any suitable manner with the usual wooden pump-rod 23. This structure forms one of the pistons of a pump, the plug 19 forming a convenient means of connecting the rod 22 with the lower piston and the passage 21 serving to receive a bar to facilitate screwing and unscrewing the plug. In connection with the piston just described there is employed an upper piston including a downwardly exteriorly tapered body portion 25, below which is an interiorly-threaded cylindrical portion 26, in which is engaged a bushing 27, having a flange 28 at its outer end, which flange is adapted to press against a leather washer 29 and force the latter onto the tapered portion of the piston when the bushing is screwed into the body, so that the washer will be expanded against the inner surface of the pump-barrel to form a water-tight joint. From the bushing 28 extend downwardly the convergent arms 30, connected by a collar 31, through which the rod 22 passes. The lower end of the bore of the collar 31 is countersunken to receive packing 32, and a cap 33 is engaged with the exterior threads of the collar to compress the packing in the well-known manner, this packing serving to take up any wear and hold the rod 22 at all times centrally of the collar. Within the tapered portion of the body 25 is a cylindrical guide 34, supported or held in place by the radiating arms 35, the lower end of the bore of the guide being countersunken and screw-threaded to receive a bushing 36, which is adapted to compress packing material 37 in the inner end of the countersink, so that it will fit tightly about the rod 22 and form a water-tight joint, while permitting of free movement of the rod. From the body portion 25 there extends upwardly a cage, including spaced arms 38, and within this cage is disposed a valve 39, having a rubber or other suitable lower face 40, which is adapted to rest upon the guide 34 and the seat 41 at the bases of the arms 38 to close the passages between the arms 35 against downward passage of water, the valve having sufficient vertical movement to permit of upward passage of water. The arms 38 are connected at their upper ends by the sleeve 42, through which the rod 22 snugly passes and which is exteriorly threaded to receive a coupling 43, which connects with the lower tubular portion 44 of the connector, the upper portion of which is semicylindrical and is connected with the usual wooden pump-rod 45 by means of rivets 46 or in any other suitable manner. With this construction it will be understood that one piston may be moved downwardly while the other is being moved upwardly and that each piston in its upward movement will lift water, the lower piston serving to force the water through the upper piston during the upper movement of the former and the downward movement of the latter and the upper piston serving to continue the upward movement of the water during the upward movement of the upper piston and the downward movement of the lower piston.

It will be understood, of course, that the pistons may be reciprocated in any suitable manner; but there is shown a rocker 50, pivoted to the side of the upper portion of the pump-barrel and having a handle 51 for oscillating it. The ends of the rocker are connected by rods 52 and 53 with the upper end portions of the pump-rods 45 and 23. Each of the pump-rods is of course formed in sections when used in a deep well, the wooden sections having metal end pieces 54 fastened thereto, which are threaded and connected by a common form of coupling 55, the end pieces 54 having right and left threads. The upper ends of the uppermost wooden pump-rod sections are provided with metal plates 56, with which the rods 52 and 53 are pivotally connected.

It will be understood that in practice modifications of the specific construction shown may be made and any suitable materials and proportions may be used for the various parts without departing from the spirit of the invention.

What is claimed is—

In a pump, the combination with a barrel having an upwardly-opening valve at its lower end, of a lower piston slidably mounted in the barrel, a rod for the lower piston, an upwardly-opening valve in said piston, an upper piston comprising a body portion, a portion of which is tapered, a washer disposed upon the tapered portion, a bushing engaged in the body and provided with a flange disposed to engage and move the washer upon the tapered portion, a collar connected with and spaced below the bushing and through which the rod of the lower piston is slidably passed, a stuffing-box for said rod carried by the collar, a guide in the upper piston through which said rod is passed, a stuffing-box for the rod in said guide, a valve-seat including the upper end of the guide, a valve for said seat slidably engaged with the rod, a rod connected with the upper piston, and means for reciprocating said rods oppositely.

In testimony whereof I affix my signature in presence of two witnesses.

HARRISON H. ARKWRIGHT.

Witnesses:
  GEO. H. CHANDLEE,
  JOS. H. BLACKWOOD.